(12) United States Patent
Grabania et al.

(10) Patent No.: US 7,866,618 B2
(45) Date of Patent: Jan. 11, 2011

(54) AUTOMATED TILT HEAD FOR ELECTRONIC DISPLAY MOUNT

(75) Inventors: Bogdan Grabania, Savage, MN (US); Kamil Sienkiel, Savage, MN (US)

(73) Assignee: Milestone AV Technologies LLC, Savage, MN (US)

( * ) Notice: Subject to any disclaimer, the term of this patent is extended or adjusted under 35 U.S.C. 154(b) by 463 days.

(21) Appl. No.: 12/113,017

(22) Filed: Apr. 30, 2008

(65) Prior Publication Data
US 2009/0230271 A1 Sep. 17, 2009

(30) Foreign Application Priority Data
Mar. 14, 2008 (PL) .................................... 384694

(51) Int. Cl.
*E04G 3/00* (2006.01)
(52) U.S. Cl. ............ 248/274.1; 248/291.1; 248/292.12; 248/371; 361/679.01
(58) Field of Classification Search ............. 248/274.1, 248/291.1, 292.12, 292.14, 205.1, 220.21, 248/220.22, 371, 393, 396, 397, 917–923; 361/681, 679.01, 679.22, 679.23
See application file for complete search history.

(56) References Cited

U.S. PATENT DOCUMENTS

| | | |
|---|---|---|
| 4,562,988 A | 1/1986 | Bumgardner |
| 4,762,378 A | 8/1988 | Kagmi |
| 4,959,645 A | 9/1990 | Balz |
| 5,250,888 A | 10/1993 | Yu |
| 5,583,735 A | 12/1996 | Pease et al. |
| 5,634,622 A | 6/1997 | Pye |
| 6,149,253 A | 11/2000 | Talasani |
| 6,288,891 B1 | 9/2001 | Hasegawa et al. |

(Continued)

FOREIGN PATENT DOCUMENTS

GB  2370171 A  6/2002

(Continued)

OTHER PUBLICATIONS

File History for U.S. Appl. No. 12/113,013, filed Apr. 30, 2008 and Published Feb. 4, 2009 as Publication No. 2009/0084913.

(Continued)

*Primary Examiner*—Terrell Mckinnon
*Assistant Examiner*—Todd M. Epps
(74) *Attorney, Agent, or Firm*—Patterson Thuente Christensen Pedersen, P.A.

(57) ABSTRACT

An automated tilt head assembly for tilting of an electronic display screen from a vertical plane and for rotation of the tilt head assembly about a vertical axis of rotation. The automated tilt head assembly generally includes a mobile carrier surface to which an electronic display device is mounted, a guide system for defining a range of tilt motion about a tilt axis, and a power-driven unit having a motor and gear assembly for automatically and selectively controlling the tilt motion. The motor drives a worm member, which by means of a gear, mates with a toothed sector of the mobile carrier surface, to thereby control the tilt motion of the mobile carrier surface. The tilt head assembly further includes a second power-driven unit having a motor and gear assembly to control rotation of the head assembly about a vertical axis.

20 Claims, 3 Drawing Sheets

U.S. PATENT DOCUMENTS

| | | | |
|---|---|---|---|
| 6,354,550 B2 | 3/2002 | Jeong | |
| 6,384,875 B2 | 5/2002 | Bertagna | |
| 6,476,879 B1 | 11/2002 | Ho et al. | |
| 6,484,993 B2 | 11/2002 | Huffman | |
| 6,633,276 B1 | 10/2003 | Jaynes | |
| 6,752,363 B2 | 6/2004 | Boele | |
| 6,758,454 B2 | 7/2004 | Smed | |
| 6,816,177 B2 | 11/2004 | Wang et al. | |
| 6,819,550 B2 | 11/2004 | Jobs et al. | |
| 6,863,252 B2 | 3/2005 | Bosson | |
| 6,905,101 B1 * | 6/2005 | Dittmer | 248/274.1 |
| 6,997,422 B2 | 2/2006 | Sweere et al. | |
| 7,028,961 B1 | 4/2006 | Dittmer et al. | |
| 7,042,714 B2 | 5/2006 | Hillman et al. | |
| 7,048,242 B2 | 5/2006 | Oddsen, Jr. | |
| 7,066,435 B2 | 6/2006 | Oddsen, Jr. et al. | |
| 7,178,775 B2 | 2/2007 | Pfister et al. | |
| 7,239,101 B2 * | 7/2007 | Choi | 318/280 |
| 7,661,642 B2 * | 2/2010 | Oh et al. | 248/274.1 |
| 2002/0033436 A1 | 3/2002 | Peng et al. | |
| 2004/0031894 A1 | 2/2004 | Smed | |
| 2005/0110911 A1 | 5/2005 | Childrey et al. | |
| 2005/0179618 A1 | 8/2005 | Oh | |
| 2005/0253699 A1 | 11/2005 | Madonia | |
| 2006/0017356 A1 | 1/2006 | Hoss | |
| 2006/0076860 A1 | 4/2006 | Hoss | |
| 2006/0219856 A1 | 10/2006 | Oh | |
| 2006/0238661 A1 | 10/2006 | Oh | |
| 2007/0023603 A1 | 2/2007 | Oh et al. | |
| 2007/0030405 A1 | 2/2007 | Childrey et al. | |
| 2007/0125917 A1 | 6/2007 | Oh et al. | |
| 2010/0091438 A1 * | 4/2010 | Dittmer | 361/679.01 |

FOREIGN PATENT DOCUMENTS

| | | |
|---|---|---|
| JP | 2000214787 A | 8/2000 |
| JP | 2001142408 A | 5/2001 |
| JP | 2005208080 A | 8/2005 |
| WO | WO2008/083396 A1 | 7/2008 |
| WO | WO2009/114028 A1 | 9/2009 |

OTHER PUBLICATIONS

Search Report cited in PCT/US2008/062100, dated Jan. 29, 2009, 1 Pg.

Page 64 from Sanus Systems™ Catalog © 2008 Milestone AV Technologies, 1 Pg.

* cited by examiner

AUTOMATED TILT HEAD FOR ELECTRONIC DISPLAY MOUNT

RELATED APPLICATIONS

This application claims priority to Polish Application No. P 384 694, filed Mar. 14, 2008, hereby fully incorporated herein by reference.

FIELD OF THE INVENTION

The present invention relates to mounting systems for electronic displays and devices and more particularly to an automated tilt head assembly for electronic displays and devices.

BACKGROUND OF THE INVENTION

Flat panel electronic display devices such as liquid crystal displays (LCD) and plasma displays offer many advantages over conventional cathode ray tube (CRT) and rear projection displays, such as improved picture resolution, elimination of screen flicker, and greatly decreased physical dimensions. Consequently, flat panel displays are becoming commonplace in business and residential settings.

Often, it is desirable to mount a flat panel display from a fixed structure such as a wall, ceiling, column or other structural feature. Consequently, specialized mounts have been developed to enable displays to be mounted from fixed structures, while also enabling selective positioning of the display for visibility or convenience.

Some prior manually adjustably positionable mounts include various arrangements of brackets and arms to enable tilting of the display screen. Examples of such tilt mounts are disclosed in U.S. Pat. No. 6,752,363 to Boele, and U.S. Patent Publication No. 2002/0033436A1 to Peng et al. A drawback of such simple tilt devices wherein the tilt axis passes through the mount behind the display is that the display tends to tip forward or backward about the tilt axis unless it is held in the desired position with frictional or other mechanical locking devices. In that large flat panel display devices, particularly plasma displays, can be quite heavy and unwieldy, it can be difficult for an individual to simultaneously lift the display in the desired position and manipulate the mechanical locking device to fix the display in position.

In other prior mounts, this drawback is overcome by locating the tilt axis of the display within the display itself preferably proximate the display center of gravity. Such mounting devices are disclosed, for example, in U.S. Pat. No. 6,905,101 to Dittmer and U.S. Pat. No. 7,028,961 to Dittmer et al., each hereby fully incorporated herein by reference.

For example, the flat screen mounting system of the '101 Patent includes two joined mounting elements, one of which is a wall mounting support fastened to a stable, fixed mounting surface, such as a wall, while the flat screen is mounted to the other mounting element which is a mounting panel. One of the two joined mounting elements has a guide or slide, along which the mounted screen moves or revolves in an arc with regard to a horizontal screen rotation axis. The screen rotation axis is placed near the screen's center of gravity. The mounting panel of the screen is joined and fastened to the wall mounting support with a dual arm system made up of front and rear arms, joined with hinges forming a parallelogram capable of parallel movement. In addition, the support is provided with a vertical axle formed from a bolt embedded in the end parts of the arms. Displacement of the display screen from the vertical plane is accomplished through manual tilting or lifting which results in shifting of pilot bars along bow-shaped guides. The rotation of the display screen around the vertical axle is accomplished via manual rotating which results in rotating the support around the pilot bar. All movements of the head of the '101 Patent require application of manual operation.

Another adjustment device is described in U.S. Pat. No. 7,178,775 to Pfister et al. The adjustment device of the '775 Patent is designed for titling the display screen and, is cable of shifting the screen along the horizontal axis of rotation which is located in the center of gravity of the screen. The device comprises a support and mount, which are mutually connected through sliding, leaving the chance of being shifted along the arch track. The screen titling axle is located in the center of a circle, a section of which is the arch track. The support and the mount are in the form of a clamping ring. The support includes the arch sliding which matches the bow-shaped holes in the mount. The display screen is shifted manually in all directions.

Due to the wide variations in display configuration it can sometimes be difficult to position the display on these prior mounts so that the tilt axis passes through or proximate the center of gravity so that the display is balanced. If the display is not balanced, it will tend to tip up or down on the mount unless restrained by friction or a locking mechanism, thereby presenting the drawbacks of prior art mounts. Although different mounts can be made for each model display so that the tilt axis is properly positioned for that model, this approach adds manufacturing and production cost and leads to complexity of installation.

International application PCT/US2008/000044, filed Jan. 3, 2008, which is incorporated herein in its entirety, discloses a mount for attaching a variety of makes and models of flat panel electronic displays to a fixed structure that also enables the display to be balanced about its center of gravity so as to be easily manipulated by an individual. All movements are accomplished via manual operation.

There remains a need for an automated tilt head for flat panel displays in which the tilt of the display screen from a vertical plan and the rotation of the display screen is accomplished automatically.

SUMMARY OF THE INVENTION

Embodiments of the present invention incorporate at least one motorized drive system coupled to a tilt head for automated tilt and/or rotation adjustment of the display screen. In one embodiment of the invention, a bearing element, such as an articulated arm mounting system, is capable of securing a flat panel display thereto. The bearing element is connected to an automated titling head. The tilting head includes a support fastened to the bearing element, and a swingable rocker panel operably coupled to the support. The rocker panel is adapted to receive and secure an electronic display device thereto. The support and the rocker are fitted with bow-shaped holes in registration with each other. The bow shaped holes receive and retain pilot bars and act as guides for the displacement of the pilot bars. The vertical axle is also fixed to the support.

The head further includes a power-driven system, including a motor and worm gear assembly. The motor of the power-driven system drives the pilot bars along the bow-shaped holes for tilt adjustment of the display screen towards a surface of the vertical axle. In one embodiment of the invention, rotation of a shaft of the motor in turn rotates a worm element. The worm element is in communication with a scrollwork element, such as a toothed gearwheel or segment. The scrollwork is in toothed communication with a toothed driving element fixed to the rocker. In response to the movement of the toothed driving element, the rocker is raised or lowered depending on the rotational direction of the motor's shaft, and the responding worm element. The movement of the rocker is directed by the movement of the pilot bar along the bow-shaped guides, resulting in tilting of the display screen.

In another embodiment of the invention, a second power-driven system including a motor and gear assembly is coupled to the support for rotation of the screen about a vertical axis extending through the vertical axle connected to the support. A shaft of the motor has a toothed gearwheel affixed thereto. The gearwheel is in toothed communication to a gearwheel affixed to the vertical axle. Upon rotation of the shaft, the vertical axle rotates, thereby rotating the rocker with the display screen attached thereto about the vertical axis.

The controlled-based operations of the various embodiments of the invention enable the user to make required directional adjustments to the head including tilting of the display screen towards a surface of the vertical axle and rotation of the display screen about the vertical axle.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
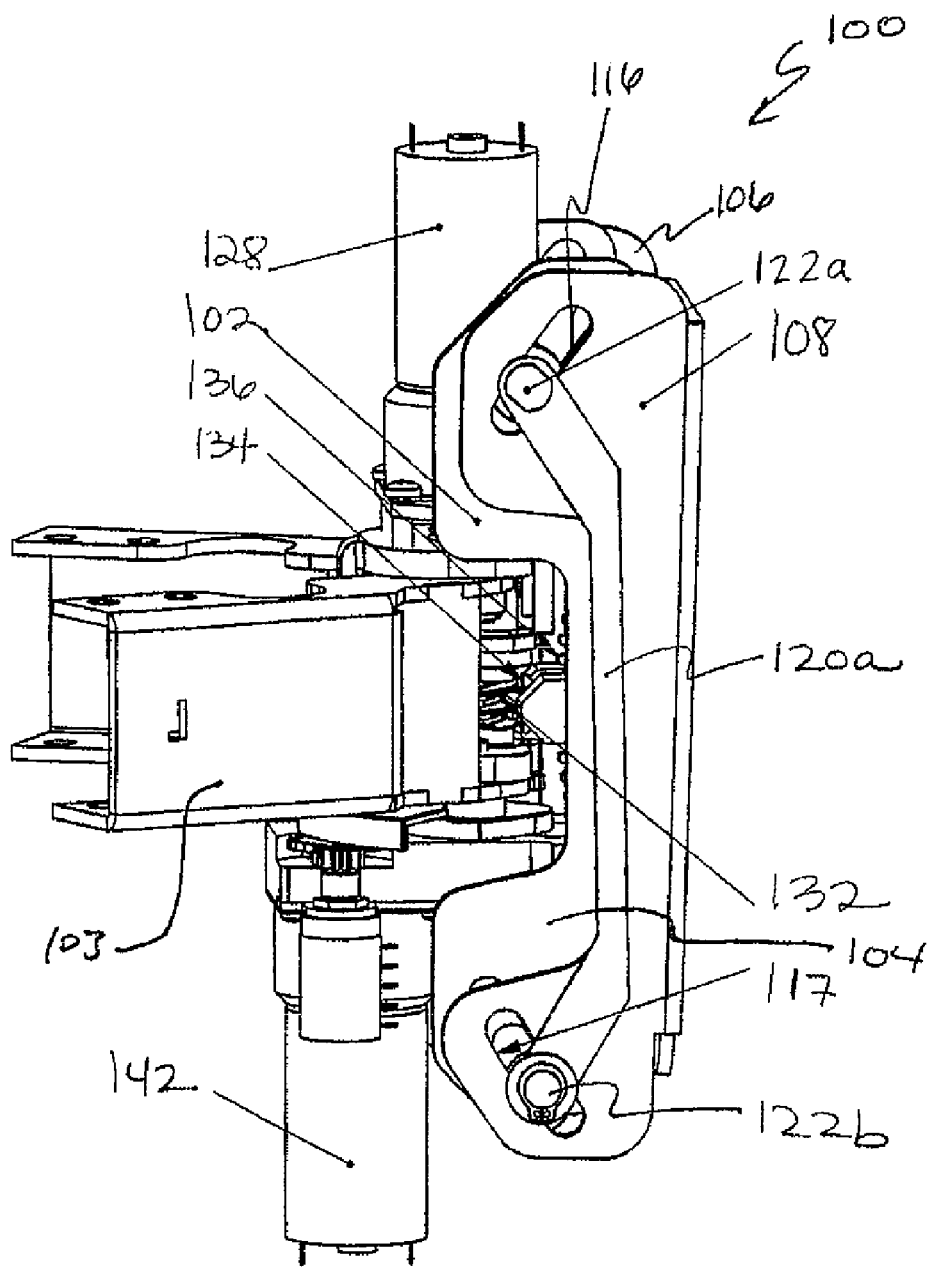
FIG. 1 is a side, cut-away view depicting an automated tilt head according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Referring to FIG. 1, an automatic tilt head assembly 100 according to embodiments of the invention generally includes support structure 102 joining head assembly 100 with a mounting assembly 103 for mounting an electronic display (such as an LCD or plasma monitor or television) to a fixed structure, such as a wall or ceiling of a structure. The mounting assembly 103 may include, for example, a single arm or dual arm assembly that is automatically or manually operated. A suitable automated mounting assembly, for example, is described in co-pending application entitled "Automated Mounting Arm for Electronic Display", filed on even date herewith, and designated with application Ser. No. 12/113,013, said application being incorporated herein by reference in its entirety. Support 102 can be a portion of the mounting assembly 103.

In one embodiment of the invention, automatic tilt head assembly 100 defines a substantially horizontal tilt axis oriented generally parallel with, and spaced apart from, the display mounting surface. When the electronic display device is received on a display mounting surface, the tilt axis extends through the electronic display device. Tilt head assembly 100 controls the selective shifting of the tilt axis between a first location spaced apart a first distance from the display mounting surface, and a second location spaced apart a second distance from the display mounting surface, wherein the second distance is greater than the first distance. Further details of the tilting operation of tilt head assembly 100 may be found in international application PCT/US2008/000044, previously incorporated by reference herein.

Figure 2:
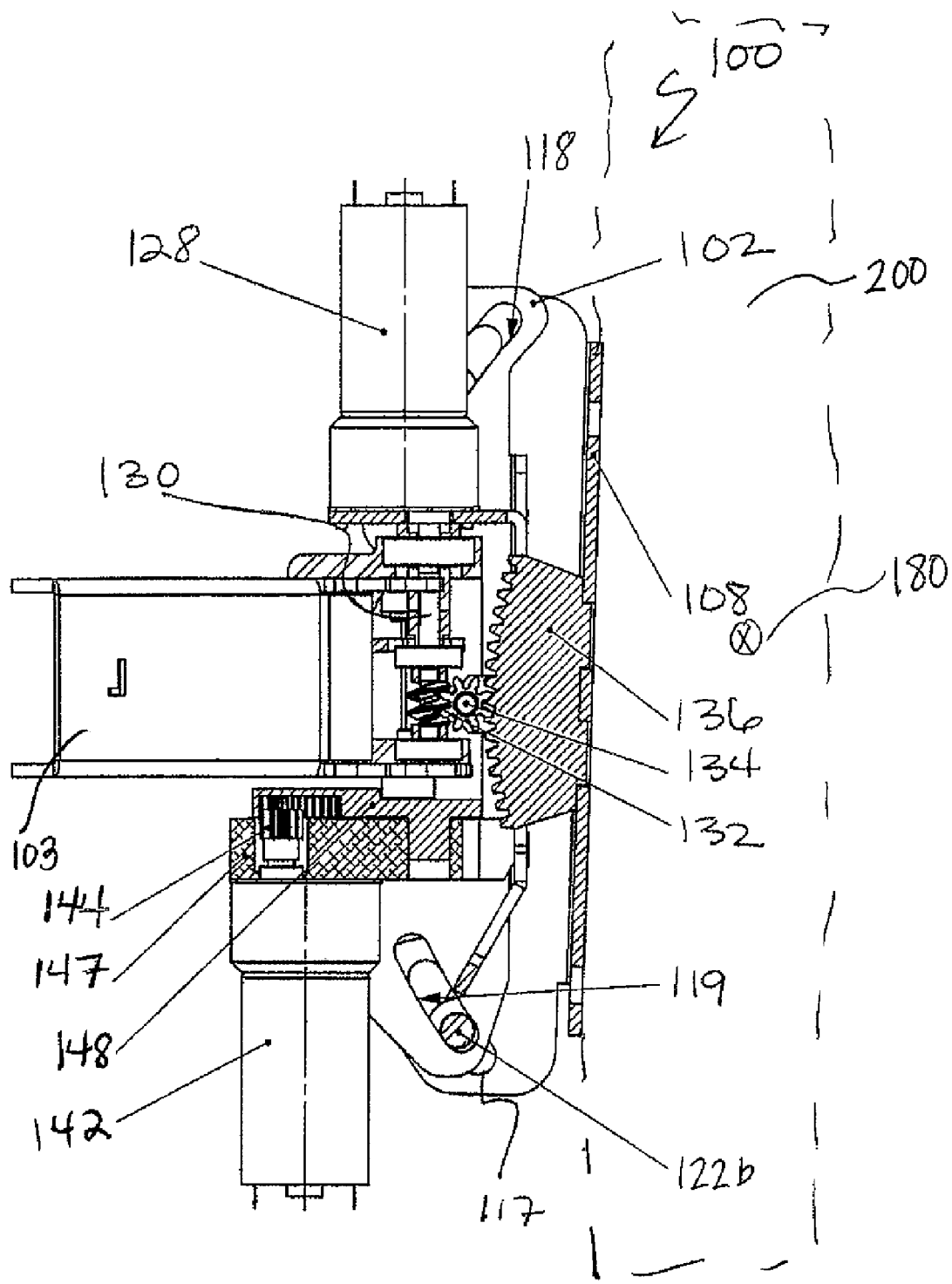
FIG. 2 is a cross-sectional view of the automated tilt head of FIG. 1.
Figure 3:
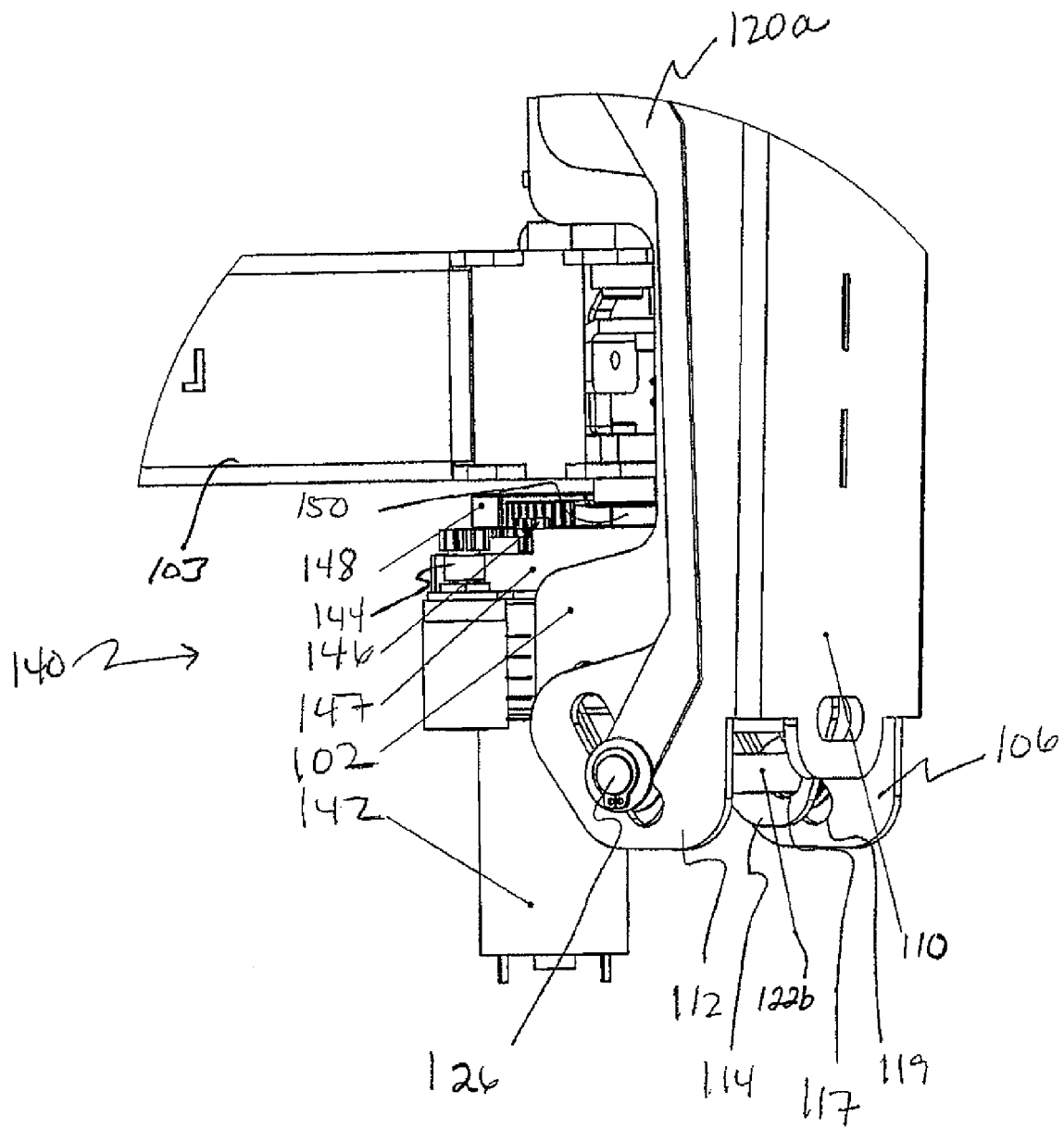
FIG. 3 is a close-up view of a motorized drive system for rotation of the head about a vertical axle according to an embodiment of the invention.

Support 102 includes a pair of lateral walls 104, 106 connected by either a front wall, or top wall. A mobile rocker 108 is operably coupled to support 102 for tilting a display screen from the vertical plane substantially parallel to the plane of the fixed structure. Referring to FIG. 3, mobile rocker 108 comprises a display mounting area 110 and a pair of lateral walls 112, 114. Referring back to FIGS. 1 and 2, lateral walls 112, 114 of mobile rocker 108 include upper apertures 116 and lower apertures 117, in registration with upper apertures 118 and lower apertures 119, respectively, of lateral walls 104, 106 of support 102. Apertures 116-119 can comprise, for example, a bow-shaped or straight slot.

Lower and upper apertures 116-119 define guide structures positioned along an arc centered on the tilt axis. Upper apertures 116 and 118 serve as guides for an upper follower element 122a, or pilot bar, that extends through upper apertures 116 and 118, and lower apertures 117 and 119 serve as guides for a lower follower element 122b. A first connecting element 120a, such as an arm, extending parallel to the outer surface of lateral wall 112 of mobile rocker 108, connects the first ends of upper and lower follower elements 122, and a second connecting element 120b, extending parallel to the outer surface of lateral wall 114 connects the second ends of upper and lower follower elements 122. The shape and orientation of lower and upper apertures 116-119 define the range of tilt motion about horizontal tilt axis 180. Upper and lower follower elements 122 are retained in position with retainers 126 on opposing ends of elements 122, facing the outer surfaces of lateral walls 112, 114 of mobile rocker 108. Upper and lower follower elements 122 and 122b can be, for example, a threaded screw or bolt, with a threaded nut attached to each end.

A motor 128 is mounted between lateral walls 104, 106 of support 102, and partially behind display mounting area 110 between lateral walls 112, 114 of mobile rocker 108. Motor 128 is attached to support 102 along with a gear system, such as, for example, a worm gear assembly. In one embodiment of the invention, a shaft 130 of motor 128, extending along a substantially vertical axis, parallel the mounting surface, drives a rotatable worm element 132 or similar device upon activation of motor 128. Worm element 132 is engaged with gear 134, which is in turn engaged with gear segment 136. Gear segment 136 is fixedly attached to rocker 108.

In operation, motor 128 rotates worm element 132, which rotates gear 134. Gear 134 in turn drives gear segment 136, causing rocker 108 to shift about its pivot axis in relation to support 102, thereby tilting the electronic display 200 attached to rocker 108. Depending upon the direction of rotation of shaft 130 and worm element 132, rocker 108 shifts up or down in relation to support 102. The tilt motion of rocker 108 about horizontal axis 180 is generally determined by the shape of apertures 116-119. Thus, rocker 108 with the electronic display 200 mounted thereto is tilted forward and backward from the vertical plane about a horizontal tilt axis extending through the electronic display 200 preferably proximate the center of gravity of the display to avoid unwanted sagging or downward tilting of the display.

Rotation of head 100 about a vertical axis 138 may be accomplished via a second drive system 140 including a motor 142 fixed to support 102, behind and below rocker 108. Referring to FIGS. 2 and 3, a rotatable shaft 144 with gear 146, set in optional casing 147, attached thereto is engaged with a second gear segment 148, which is in turn fixed to a vertical rotation axle 150 of head 100. Upon activation of motor 142, shaft 144 rotates in either a clockwise or counter-clockwise direction about a vertical axis extending through shaft 144, rotating gear 146. Gear segment 148 rotates in response to the rotation of gear 146, thereby pivoting axle 150 so that support 102 and rocker 108 are rotated about a vertical axis extending through pivoting axle 150.

The embodiments above are intended to be illustrative and not limiting. Additional embodiments are encompassed within the scope of the claims. Although the present invention has been described with reference to particular embodiments, those skilled in the art will recognize that changes may be made in form and detail without departing from the spirit and scope of the invention. For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An automated tilt head assembly for a mounting system for an electronic display device, the tilt head assembly comprising:
    a support adapted to be coupled to the mounting system;
    a mobile display carrier having at least one follower;
    a first guide member defining a first guide structure positioned along an arc centered on a tilt axis, wherein the at least one follower and the first guide structure are engaged and together define a range of tilt motion about the tilt axis; and
    a first automated control mechanism including a first motor and a first gear assembly, wherein the first automated control mechanism is operably coupled to the first guide member to automatically and selectively shift an orientation of the first guide structure to thereby effect automatic and selective shifting of the tilt axis between a first and second positions.

2. The automated tilt head assembly according to claim 1, wherein the first guide structure is a bow-shaped slot.

3. The automated tilt head assembly according to claim 1, further comprising a second guide member defining a second guide structure positioned along the arc centered on the tilt axis, wherein the mobile carrier includes at least a pair of followers, and wherein one of the pair of followers is engaged with the first guide structure and the other of the pair of followers is engaged with the second guide structure.

4. The automated tilt head assembly according to claim 3, wherein the first and second guide members are operably coupled such that when the orientation of the first guide structure is shifted with the automated control mechanism, an orientation of the second guide structure is also shifted.

5. The automated tilt head assembly according to claim 1, wherein the first gear assembly of the first automated control mechanism comprises a worm gear including a worm member fixed to a shaft of the first motor, and a gear segment operably coupled with the worm member, wherein the gear segment is fixed to the mobile carrier and operably coupled to the first guide member, such that upon rotation of the shaft, the shaft drives the worm member, which in turn drives the gear segment, thereby automatically and selectively shifting the orientation of the first guide structure to effect automatic and selective shifting of the tilt axis between the first and second positions.

6. The automated tilt head assembly according to claim 5, wherein the first gear assembly further comprises a gear, wherein the worm member is operably coupled to the gear, and the gear is in toothed communication with the gear segment.

7. The automated tilt head assembly according to claim 1, further comprising:
    a second automated control mechanism with a second motor and a second gear assembly, wherein the second automated control mechanism is fixed to the support member, and wherein the automated tilt head assembly automatically and selectively rotates about a vertical axle fixed to the support member.

8. The automated tilt head assembly according to claim 7, wherein the second gear assembly comprises a first toothed member fixed to a shaft of the second motor and a second toothed member operably coupled to the first toothed member and fixed to the vertical axle, such that when the shaft is rotated, the vertical axle rotates thereby automatically and selectively rotating the tilt head assembly about the vertical axle.

9. The automated tilt head assembly according to claim 1, wherein the first automated control mechanism is adapted to be remotely controlled.

10. The automated tilt head assembly according to claim 7, wherein the second automated control mechanism is adapted to be remotely controlled.

11. An automated tilt head assembly for a mounting system for an electronic display device, the tilt head assembly comprising:
    a support adapted to be coupled to the mounting system;
    a mobile display carrier having at least one follower;
    a first guide means for guiding tilting motion of the mobile display carrier about a tilt axis, wherein the at least one follower and the first guide means are engaged and together define a range of tilt motion about the tilt axis; and
    a first automated control means for automatically and selectively tilting the mobile display carrier by automatically and selectively shifting the tilt axis between a first and second location.

12. The automated tilt head assembly according to claim 11, wherein the first guide means defines a first guide structure positioned along an arc centered on the tilt axis, wherein the at least one follower and the first guide structure are engaged and together define the range of tilt motion about the tilt axis.

13. The automated tilt head assembly according to claim 11, further comprising a second guide means, wherein the mobile carrier includes at least a pair of followers, and wherein one of the pair of followers is engaged with the first guide means and the other of the pair of followers is engaged with the second guide means.

14. The automated tilt head assembly according to claim 13, wherein the second guide means defines a second guide structure positioned along the arc centered on the tilt axis, and wherein the first and second guide means are operably coupled such that when the orientation of the first guide structure is shifted with the first automated control means, an orientation of the second guide structure is also shifted.

15. The automated tilt head assembly according to claim 11, wherein the first automated control means including a first motor and a first gear assembly, wherein the first automated control means is operably coupled to the first guide means to automatically and selectively shift an orientation of the first guide means to thereby effect automatic and selective shifting of the tilt axis between a first and second location.

16. The automated tilt head assembly according to claim 15, wherein the first gear assembly of the first automated control means comprises a worm gear including a worm member fixed to a shaft of the first motor, and a toothed segment operably coupled with the worm member, wherein the second toothed segment is fixed to the mobile carrier and operably coupled to the first guide means, such that upon rotation of the shaft, the shaft drives the worm member, which in turn drives the toothed segment, thereby automatically and selectively shifting an orientation of the first guide means to effect automatic and selective shifting of the tilt axis between the first and second locations.

17. The automated tilt head assembly according to claim 16, wherein the first gear assembly further comprises a scrollwork, wherein the worm member is operably couple to the scrollwork, and the scrollwork is in toothed communication with the toothed segment.

18. The automated tilt head assembly according to claim 11, further comprising:

a second automated control means for rotating the tilt head assembly about a vertical axle fixed to the support member.

19. The automated tilt head assembly according to claim 18, wherein the second automated control means includes a second motor and a second gear assembly, wherein the second gear assembly comprises a first toothed member fixed to a shaft of the second motor and a second toothed member operably coupled to the first toothed member and fixed to the vertical axle, such that when the shaft is rotated, the tilt head assembly is thereby automatically and selectively rotated about the vertical axle.

20. The automated tilt head assembly according to claim 19, further comprising remote control means for remotely controlling at least one of the first automated control means and the second automated control means.

* * * * *